United States Patent [19]
Cislo et al.

[11] 4,203,615
[45] May 20, 1980

[54] AUTOMOTIVE VEHICLE SUSPENSION

[75] Inventors: Casimer J. Cislo, Southfield; Seth B. Cummings, Jr., Clarkston, both of Mich.

[73] Assignee: General Motors Corporation, Detroit, Mich.

[21] Appl. No.: 943,374

[22] Filed: Sep. 18, 1978

[51] Int. Cl.² .............................................. B60G 3/14
[52] U.S. Cl. .................................. 280/689; 267/11 R
[58] Field of Search ................... 280/689, 721, 723; 267/11, 57

[56] References Cited

U.S. PATENT DOCUMENTS

| | | | |
|---|---|---|---|
| 2,626,797 | 1/1953 | Cuskie | 267/11 |
| 3,181,885 | 5/1965 | Baracos | 267/57 |
| 3,218,053 | 11/1965 | Shreve | 280/689 |
| 3,498,631 | 3/1970 | Van Winsen | 280/124 |

*Primary Examiner*—Philip Goodman
*Attorney, Agent, or Firm*—Dean L. Ellis

[57] ABSTRACT

Independent rear suspension for automobiles of the type including at each side of the vehicle a semi-trailing control arm swingable on an axis angularly displaced with respect to a transverse plane of the sprung mass, is further provided with a stabilizer bar connected between the control arms by having end crank arm portions of the bar each anchored at its terminal end to the control arm and further connected to the control arm at a spaced location from the anchor by a swingable bushed linkage such that the stabilizer bar experiences no stress affecting the suspension spring rate during normal pitch and ride motion of the sprung mass.

4 Claims, 5 Drawing Figures

AUTOMOTIVE VEHICLE SUSPENSION

This invention relates to automotive vehicle suspension, and more particularly to roll stabilized automotive vehicle suspension.

Past practice in the use of roll stabilizer bars in automobile independent suspension has had the bar mounted in the automobile such that in order to perform its function of interconnecting and transferring force between transversely opposite road wheels to reduce roll of the vehicle sprung mass, it often necessarily also contributes resilient resistance or rate during normal pure pitch and ride motion of the sprung mass independent of roll. In some installations, elastomeric bushings are employed as stabilizer bar mounts so that the pitch and ride resistance is chiefly confined to localized stress of the bushings. Yet, a proper such bushing mount also exhibits some amount of resistance or "parasitic" rate.

Some independent suspensions feature deflectable road wheel control arms arranged for reasons of vehicle handling to swing about axes substantially angularly offset from a transverse disposition. In such a case, connected portions of a conventional transverse stabilizer bar necessarily undergo significant lateral displacement during vertical pitch and ride deflection of the road wheels; with corresponding effect on pitch and ride rate.

It is an object of the present invention to provide an automotive vehicle suspension including a stabilizer member having a transverse torsionally active portion effective for roll stabilization of the vehicle sprung mass without adding additional rate or resistance to the pitch and ride motion of the sprung mass.

Another object of the invention is to achieve the foregoing object of parasitic rate elimination and in a structure suitable to installation within minimum space and without interference with other suspension components or their function.

In its most specific aspects, the invention features a stabilizer installation for independent rear wheel suspension of the so-called semi-trailing control arm type in which control arms at each side of the vehicle are mounted to swing on axes angularly related to a transverse plane of the vehicle. A stabilizer bar including a torsionally active transversely disposed middle or main portion is arranged such that turned crank arm portions of the bar can be connected directly and exclusively with the control arms and thereby transfer roll stabilization force therebetween. However, by use of spaced anchor and swingable link connecting means, controlled lateral relative displacement is allowed to occur between the stabilizer bar crank arm portions and the suspension control arms so that vertical pitch and ride deflections of the road wheels about such angularly disposed axes of control arm swing relative to the sprung mass may proceed without significant stress in the stabilizer bar or its attachments.

The foregoing and other objects, features and further advantages of the invention will be readily apparent from the following specification and drawings wherein.

Figure 1:
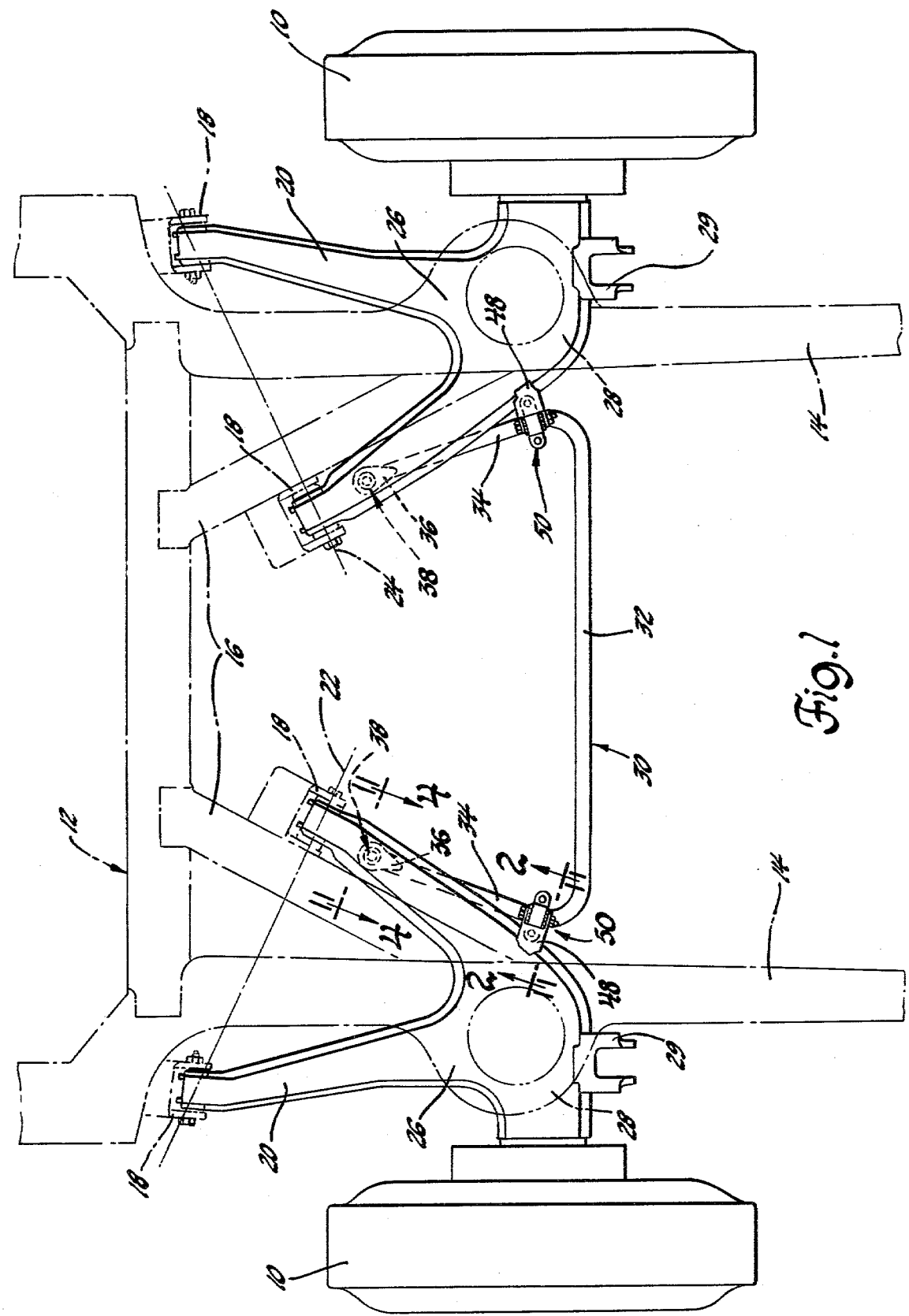
FIG. 1 is a fragmentary plan view, partially in phantom, of an automotive vehicle suspension according to this invention.

Referring now in particular to FIG. 1 of the drawings, independent rear suspension for an automotive vehicle is illustrated and including a pair of transversely opposite road wheels 10 and a perimeter type vehicle frame 12 constituting a portion of the vehicle sprung mass and including side rails 14. As to applicability of the invention, it is immaterial whether road wheels 10 are driving or non-driving and similarly it will be understood that the invention has equal application in front suspension installations in which roll stabilization means are to be provided. Frame 12 further includes truss elements 16, and extending both from the inner sides of such elements 16 and also rearwardly from the rear torque box areas of rails 14 are conventional mounting brackets 18 for pin-type bushed suspension mounts.

Brackets 18 are generally arranged for pivotal support of road wheel control arms of the so-called "semi-trailing" type in which the road wheel control arms swing about intersecting axes each disposed at an acute angle to a transverse plane of the vehicle sprung mass as is well known. However, the invention applies equally to other types of suspension in which the control arms swing on differently arranged axes. In the present instance, a pair of control arms 20 are mounted, as by conventional elastomer bushed pin-type elements to a respective pair of mounting brackets 18 such that the control arms will swing about axes 22 and 24 as indicated. Road wheels 10 are mounted to suitable spindle or like structure at the outboard ends of the two control arms 20 in conventional manner and brake assemblies and brake backing plates, none of which is a part of this invention, may further be associated with such outboard control arm ends.

Each control arm 20 includes generally conventional spring seat area 26 and a primary suspension spring of the coil type is installed between such area 26 and a spring seat tower, indicated in phantom at 28, rising upwardly from frame rails 14 in normal fashion. Hydraulic dampers or shock absorbers may also be installed between such tower 28 or similar location of the frame, and the control arm 20 as at bracket 29.

In accordance with this invention, a stabilizer member 30 extends transversely of the vehicle for connection between the two control arms 20 and includes a transversely disposed torsionally active main or middle portion 32 and crank arm end portions 34 turned forwardly of the vehicle for connection to a respective control arm 20. The stabilizer member may indeed be formed of bar section material or optionally as a tube.

In the present instance, due to problems of space and interrelation with any adjacent region of the sprung mass, and also to accomplish an added advantage of elimination of structure-borne road disturbances into the passenger area of the vehicle, the crank arm portions 34 are each mounted exclusively to respective control arms 20 rather than at one location to such control arm and at another location to the vehicle frame or other portion of the vehicle sprung mass. However, it should be understood that basic advantages of the present invention are equally applicable to the latter variety of installation.

Figure 4:
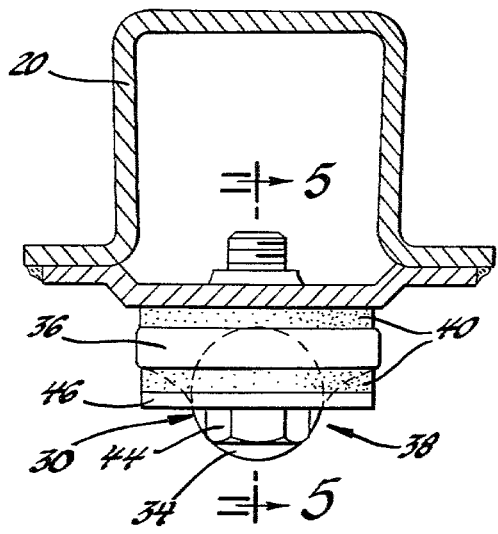
FIG. 4 is an enlarged sectional view taken along the plane indicated by lines 4—4 of FIG. 1.

Referring to the area of the left-hand control member 20 in particular, the stabilizer member has connection thereto by a first mounting of a terminal end region 36 of crank arm 34 by an anchor stud means 38. As seen better in FIGS. 4 and 5, the extremity of such terminal end region is flattened and apertured as an eye to receive a pair of elastomeric biscuit elements 40 over a sleeve 42 which in turn receives threading of the anchor stud 44 into a threaded bore of the control arm and over a washer 46. The two biscuits 40 provide a grommet-like structure which effectively isolates the crank arm from direct potentially noisy contact with the control arm and yet provides a substantially torsionally rigid connection thereto.

Figure 2:
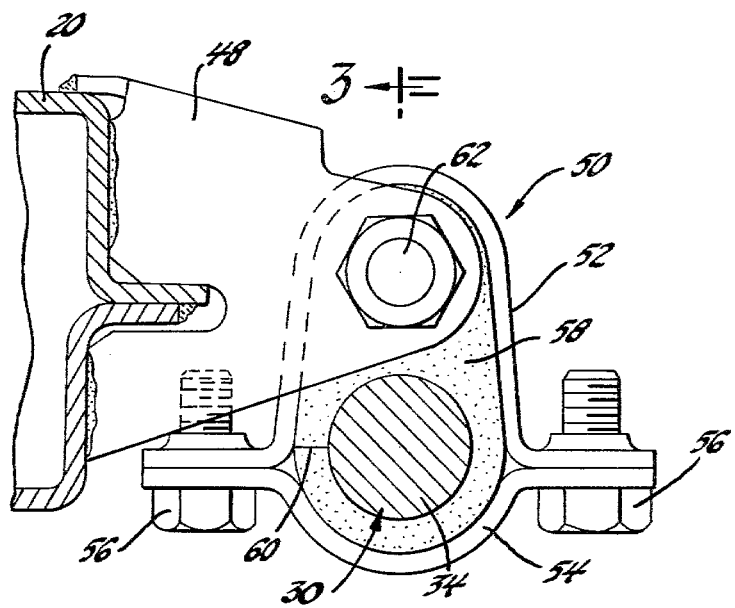
FIG. 2 is an enlarged view taken generally along the plane indicated by lines 2—2 of FIG. 1.
Figure 3:
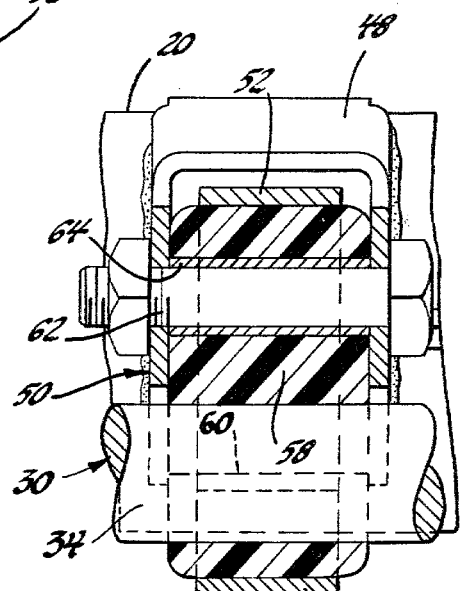
FIG. 3 is a sectional view taken generally along the plane indicated by lines 3—3 of FIG. 2.

At opposite end region of the crank arm portion 34 a swinging link connection completes the mounting of each end of the stabilizer member on a respective control arm. Referring to FIGS. 2 and 3, the control arm has affixed thereto a U-shaped bracket 48 receiving between the legs thereof, best seen in FIG. 3, a link assembly 50 mounted to the stabilizer member crank arm. Such assembly includes an upper element 52 formed into a U-shape with threaded apertures in the turned flanges thereof and a lower clamp element 54 fastened to the upper element by a pair of studs 56. An elastomeric bushing element 58 of special shape is located compressively within the joined upper and lower elements 52 and 54, such bushing having a preformed separation as indicated at 60 in the lower portion thereof such that the link assembly may be assembled over the stabilizer bar by inserting the latter through the separation 60 and then joining the upper and lower elements with studs 56. A through-bolt fastener 62 extends through a sleeve 64 in the upper portion of the bushing to mount the link assembly to bracket 48 for relatively friction-free swinging movement generally laterally of the vehicle.

It is of course readily apparent that due to the angular disposition of axes 22 and 24 of the control arms such swinging movement of the link assembly will occur during normal pure pitch or ride motion of the vehicle sprung mass relative to the two road wheels 10 considered as a unit. Movement of the control arms 20 about axes 22 and 24 in those instances in either direction from static height condition causes a degree of displacement of bracket 48 transversely of the vehicle as well as vertically. This may then occur without imposing any deflection in either the stabilizer bar crank arms or in bushing 58 to an appreciable enough degree to result in parasitic rate or resistance to such vertical deflections of the control arms 20. Still, the function of roll stabilization is effective through the anchor stud means 38 and link assembly 50 such that an independent vertical deflection of one road wheel 10 relative to the other will cause torsional windup of middle portion 32 and resistance to chassis roll in normal fashion.

It should be noted that the bushing 58 is preferably so structured and of such material properties that firm association is obtained between it and the end region of crank arm 34 which it envelops yet a controlled amount of accommodation is provided to twisting of such stabilizer bar region during chassis roll. In this way, the bushing properties may advantageously contribute to a cumulative torsional resistance available from the total stabilizer installation.

Figure 5:
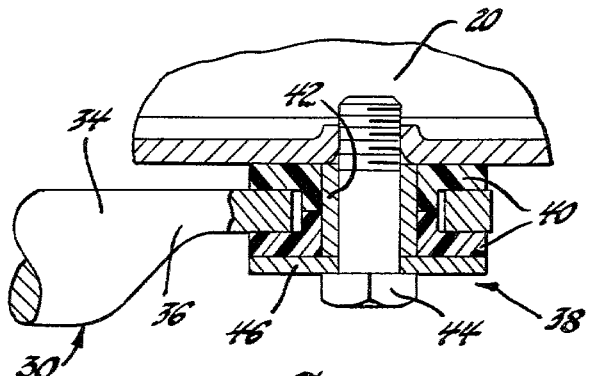
FIG. 5 is a sectional view taken generally along the plane indicated by lines 5—5 of FIG. 4.

In the flattened eye configuration of anchor stud means 38, it has been found advantageous to configure the eye aperture oblong in the transverse direction so as to accommodate transverse location tolerances of the control arms 20 on the frame 14. A similar degree of tolerance accommodation may be provided in such aperture dimension in the longitudinal direction such as indicated in FIG. 5. As an alternative to the anchor stud means 38 but with similar tolerance accommodation, the terminal end of each crank arm 34 may be bent laterally outwardly, as would be viewed in FIG. 1, and mounted to the control arm 20 by means of a U-shape clamp and elastomeric isolation elements and the flattened eye configuration may be avoided.

The embodiments of the invention in which an exclusive property or privilege is claimed are defined as follows:

1. In a vehicle including transversely opposite road wheels, spring suspension therefor comprising, a pair of control arms each mounted at an inboard end thereof on the vehicle sprung mass to swing on an axis extending at an angle to a transverse plane of the latter and mounting at the outboard end thereof a respective road wheel, a stabilizer member including a main portion extending transversely of the vehicle and crank arm portions each turned from the main portion to extend toward connection with a respective control arm, and means for mounting opposite ends of said stabilizer member on the vehicle for roll stabilization of the vehicle sprung mass and including first means mounting the crank arm portion on a respective control arm and second means including a swingable link connected with the crank arm portion of the stabilizer member at a location spaced from the first means and whereby said link may swing to preclude resistance by said stabilizer member to pitch and ride motion of the vehicle sprung mass.

2. In a vehicle including transversely opposite road wheels, spring suspension therefor comprising, a pair of semi-trailing control arms each mounted on the vehicle sprung mass to swing on an axis extending at an angle to a transverse plane of the latter and mounting at the outboard end thereof a respective road wheel, a stabilizer member including a main portion extending transversely of the vehicle and end crank arm portions each turned from the main portion to extend toward connection with a respective control arm, and means for mounting each crank arm portion to its respective control arm for roll stabilization of the vehicle sprung mass and including means mounting one end region of the crank arm portion on the control arm and swingable link means connected between the control arm and the other end region of the crank arm portion whereby said link means may swing to preclude resistance by said stabilizer member to pitch and ride motion of the vehicle sprung mass.

3. In a vehicle including transversely opposite road wheels, spring suspension therefor comprising, a pair of control arms each mounted at an inboard end thereof on the vehicle sprung mass to swing on an axis extending at an angle to a transverse plane of the latter and mounting at the outboard end thereof a respective road wheel, a stabilizer member including a main portion extending transversely of the vehicle and end crank arm portions each turned from the main portion to extend toward connection with a respective control arm, and means for mounting each crank arm portion to its respective control arm for roll stabilization of the vehicle sprung mass and including means mounting one end region of the crank arm portion on the control arm and swingable link means connected between the control arm and the other end region of the crank arm portion whereby said link means may swing to preclude resistance by said stabilizer member to pitch and ride motion of the vehicle sprung mass, said swingable link means including a link pivoted at one end thereof on the control arm and mounting at its other end an elastomeric bushing enveloping said other end region of the crank arm portion.

4. In a vehicle including transversely opposite road wheels, spring suspension therefor comprising, a pair of semi-trailing control arms each mounted on the vehicle sprung mass to swing on an axis extending at an angle to a transverse plane of the latter and mounting at the outboard end thereof a respective road wheel, a stabilizer member including a main portion extending transversely of the vehicle and end crank arm portions each turned from the main portion to extend each toward connection with a respective control arm, and means for mounting each crank arm portion to its respective control arm for roll stabilization of the vehicle sprung mass and including means mounting the terminal end of the crank arm portion on the control arm and swingable link means connected between the control arm and the crank arm portion adjacent its juncture with the main portion whereby said link means may swing to preclude resistance by said stabilizer member to pitch and ride motion of the vehicle sprung mass, said swingable link means including a link pivoted at one end thereof on the control arm and mounting at its other end an elastomeric bushing enveloping the crank arm portion.

* * * * *